July 2, 1935.　　　　C. E. JELLIFF　　　　2,006,950
OSCILLATION GENERATOR
Filed Feb. 20, 1933　　　　2 Sheets-Sheet 1
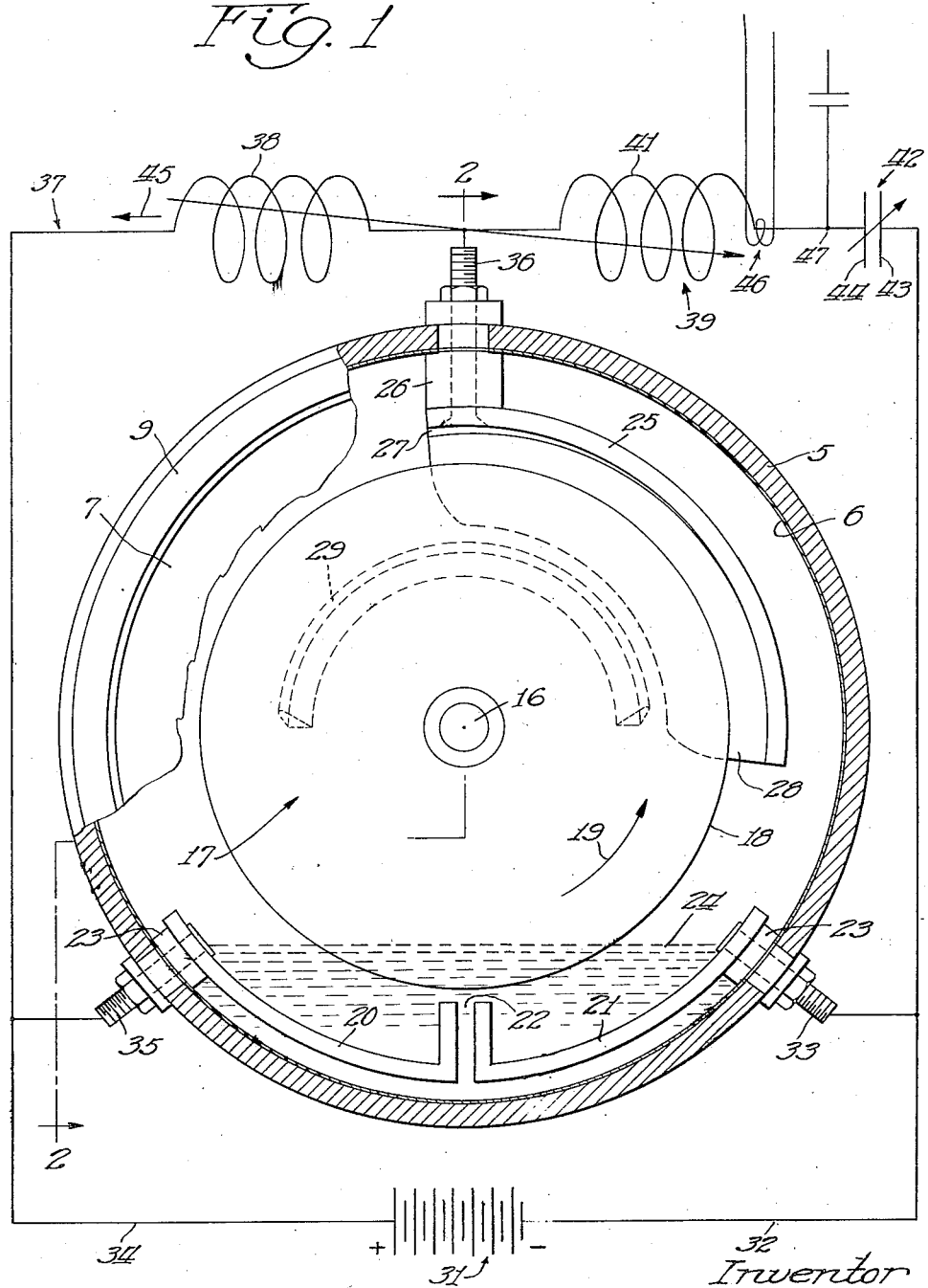

July 2, 1935.  C. E. JELLIFF  2,006,950
OSCILLATION GENERATOR
Filed Feb. 20, 1933   2 Sheets-Sheet 2
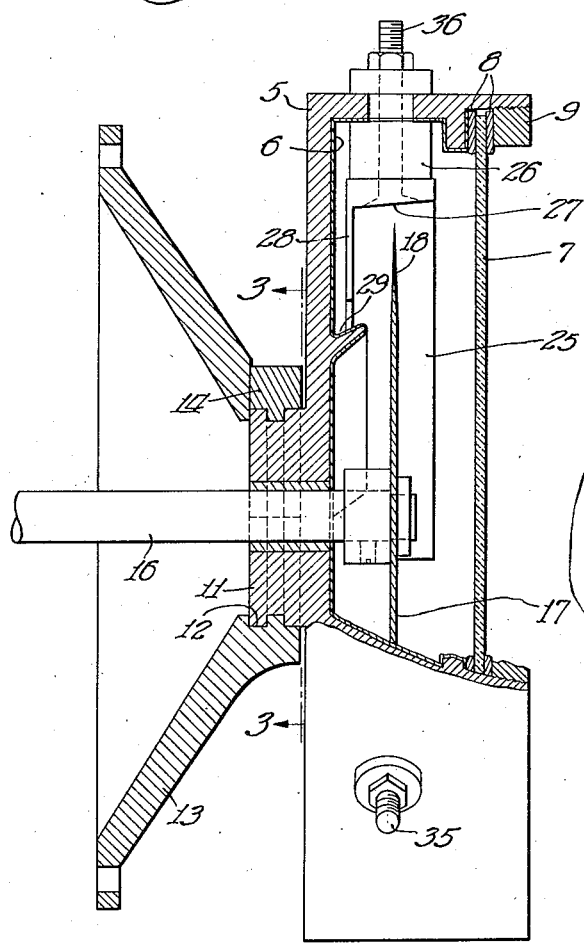
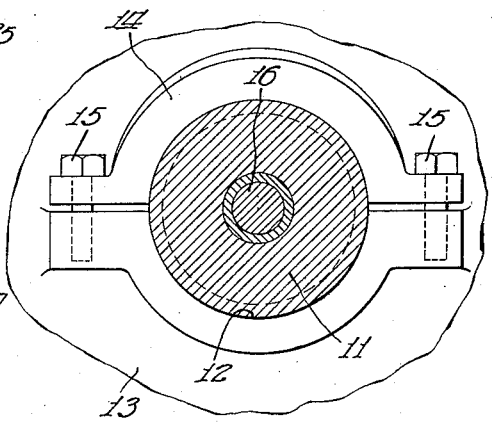
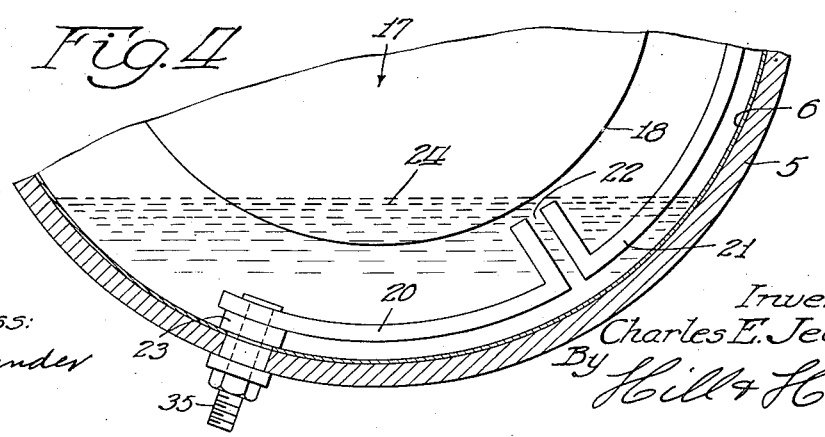

Patented July 2, 1935

2,006,950

UNITED STATES PATENT OFFICE 2,006,950

OSCILLATION GENERATOR

Charles E. Jelliff, Seattle, Wash.

Application February 20, 1933, Serial No. 657,581

11 Claims. (Cl. 250—36)

This invention relates to oscillation generators, and particularly to a device for producing oscillations of very high frequency in electrical circuits.

One object of the present invention is to provide a device capable of producing an oscillating current of constant or unvarying frequency.

Another object of the invention is to provide an apparatus wherein frequency control may be easily adjusted.

Another object of the invention is to provide an apparatus wherein no biasing is required, and wherein instability of operation due to fluctuation of biasing values is eliminated.

Another object of the invention is to provide a device for producing high frequency oscillations, wherein a suitable electrolyte is employed to provide, through its ionization, a constant quantity of electrons or minute negative charges for energizing a primary circuit inductively coupled with an oscillation circuit.

Another object of the invention is to provide a device for producing high frequency oscillations, wherein the electrons or minute negative charges produced by the ionization of the electrolyte are transmitted or transferred to the proper point in the oscillatory circuit for supplying energy to that circuit in an uninterrupted or continuous flow.

Another object of the invention is to provide a device of the character described including a collecting electrode for receiving the electrons or negative charges and transferring them to the oscillatory circuit after they have been deposited on the collecting electrode together with the electrolyte by suitable mechanical means associated with the device.

Another object of the invention is to provide a collecting electrode of suitable construction for directing the electrolyte away from the mechanical means and returning it to its source.

A further object of the invention is to provide a device of the character described wherein adjustment of the ionizing electrodes may be made to compensate for variation in the volume of electrolyte due to disassociation, evaporation, etc., thereby insuring the transfer of a maximum quantity of electrons or negative charges to the collecting electrode.

A still further object of the invention is to improve devices of the character described in sundry details hereinafter referred to and particularly pointed out in the appended claims.

One embodiment of the present invention is shown for illustrative purposes in the accompanying drawings in which Fig. 1 is a front view partly in section of a device embodying features of the present invention and showing diagrammatically the electrical circuits associated therewith;

Fig. 2 is a side view partly in section of the structure show in Fig. 1, the sectional portion of Fig. 2 being taken substantially as indicated by the line 2—2 of Fig. 1;

Fig. 3 is a fragmentary sectional view of securing means associated with the device and taken substantially as indicated by the line 3—3 of Fig. 2; and Fig. 4 is a fragmentary sectional front view of a portion of the structure shown in Fig. 1 illustrating the manner of positioning the ionizing electrodes with respect to the electrolyte in a manner to insure the transfer of a maximum quantity of electrons or negative charges to the collecting electrode.

The illustrative embodiment of the present invention comprises a container or receptacle 5 formed, in the present instance, preferably of iron or other suitable material, and having a glazed lining 6 of porcelain or other suitable material extending throughout the interior surface of the container to the open side thereof which, in the present instance, is closed by a transparent cover plate 7 shown in the present instance as formed of glass, or the like, fitted into the open side of the container 5 between sealing gaskets 8 of rubber or other suitable material, and held in place by a clamping ring 9 screw-threaded into the open side of the container as clearly shown in Fig. 2.

The container 5 is shown, in the present instance, as provided on its rear side with a hub portion 11 adapted to set into a semi-circular socket 12 formed in a supporting bracket or member 13 to permit of angular adjustment of the container 5 with respect to the bracket, the container 5 being adapted to be secured in various positions of angular adjustment by means of a semi-circular clamping member 14 positioned above the hub member 11 and adapted to be drawn into frictional engagement therewith by means of clamping bolts 15 screw-threaded into the bracket 13 as clearly shown in Fig. 3.

Rotatably mounted in a bearing formed in the hub portion 11 of the container 5 is a power shaft 16 operatively connected at one of its end portions with a suitable source of power (not shown), as for example, an electric motor, or the like, and secured to its opposite end within the container 5 is a rotor shown, in the present instance, as a disc 17 of substantial diameter, formed preferably of non-magnetic material such, for example, as aluminum, and having its periphery or edge portion beveled to form a thin edge, shown in the present instance as of knife-like form as indicated at 18, the disc 17 being adapted to rotate in a counter-clockwise direction as viewed in Fig. 1, or in the direction of the arrow 19 thereof.

Mounted within the container 5 preferably adjacent the lower portion thereof and preferably in the radial plane of the disc 17 are a pair of ionizing electrodes 20 and 21 having their inner adjacent end portions turned inwardly and spaced from each other to form a gap 22, the opposite or outer end of the electrodes 20 and 21 being rigidly mounted preferably in the annular wall of the container by means of suitable insulating leak-proof bushings 23 as clearly shown in Fig. 1.

In the present arrangement, the container 5 is supplied with a suitable quantity of electrolyte indicated at 24 sufficient to surround and cover the spaced ends of the ionizing electrodes 20 and 21 and also that portion of the disc 17 adjacent the gap 22 formed between the electrodes as clearly shown in Figs. 1 and 4. The electrolyte 24 may be of any suitable composition through which the passage of direct current will produce rapid ionization as, for example, a solution consisting of approximately eight (8) ounces of water ($H_2O$) and approximately four (4) ounces of sodium chloride ($NaCl$) has been found to be very satisfactory.

Mounted also within the container 5 preferably adjacent the upper portion thereof and also in the radial plane of the disc 17 is a third or collecting electrode 25 preferably of segmental form and mounted preferably in the annular wall of the container by means of an insulating leak-proof bushing 26.

The collecting electrode 25 is shown, in the present instance, as of arcuate or segmental form extending from its upper end adjacent the bushing 26 along and substantially parallel to a peripheral portion of the disc 17 in a direction preferably opposite to the direction of rotation of the disc, and to a point adjacent the mid-portion of the container 5 and in spaced relation to the surface of the electrolyte 24.

It will be observed that by such an arrangement, the rotation of the disc 17 with a portion of its edge passing through the electrolyte will carry a portion of the electrolytic composition around with it and discharge the electrolyte in the form of a spray onto the collecting electrode 25 from which it returns to the body of electrolyte in the lower portion of the container.

For directing the returning electrolyte away from the disc 17, the collecting electrode is provided on its inner arcuate side adjacent its upper end with an inclined portion 27 tapering off to substantially the plane of the front edge of the annular surface at a point adjacent the opposite or lower end of the electrode 25, the inclined surface 27 being adapted to drain the returning electrolyte toward an inwardly extending annular flange 28 formed along the rear edge of the electrode 25 and spaced to the rear of the disc 17.

Formed preferably on the rear wall of the container 5 is a trough or gutter 29 shown, in the present instance, as of semi-circular form and arranged to occupy a position beneath the annular flange 28 in a manner to receive the returning electrolyte therefrom and convey it laterally around the bearing of the shaft 16.

It will be observed that by such an arrangement, the electrolyte deposited on the collecting electrode 25 will be drained back into the lower portion of the container, either from the lower end of the electrode or by capillary attraction toward the flange 28 and thence into the trough or gutter 29, by which it is conveyed laterally and returned to the lower portion of the container, thereby directing the returning electrolyte away from the disc and bearing.

For ionizing the electrolyte to disassociate the negatively charged electrons therefrom, a suitable source of direct current supply is provided and shown, in the present instance, as a battery 31 having its negative terminal electrically connected by means of a conductor 32 with a terminal 33 of the ionizing electrode 21, and having its positive terminal electrically connected by means of an electrical conductor 34 with a terminal 35 associated with the ionizing electrode 20.

Operatively connected electrically to a terminal 36 of the collecting electrode 25 and the terminal of the ionizing electrode 20 is a primary inductive circuit indicated as a whole by the numeral 37 and including an air-core coil 38.

Connected also with the terminal 36 is a secondary inductive or oscillation circuit indicated as a whole by the numeral 39 and including a second air-core coil 41 so placed as to be closely inductively coupled with the coil 38, and connected, with a condenser indicated as a whole by the numeral 42, in series, to the terminal 33 of the electrode 21 and with the negative terminal of the battery 31. The condenser 42 is shown, in the present instance, as comprising a normally negative plate 43 and a normally positive plate 44, it being understood, however, that a condenser of the variable type may be employed, if so desired.

In the operation of the device, the direct current flowing from electrode 21 to electrode 20 causes ionization of the electrolyte across the gap between the electrodes 20 and 21 resulting in disassociation from the electrolyte of negatively charged electrons and causing an ultra-electronic content in the electrolyte adjacent the gap 22. As the rotor 17 is brought up to desired speed, preferably about 1800 R. P. M., the electrolyte adjacent the gap with its ultra-electronic content of negatively charged particles of electrolyte is picked up by the disc and deposited in the form of a spray on the collecting electrode 25, thereby supplying energy to the oscillatory circuit and causing current to flow through the coil 38 to the positive side of the battery 31. The flow of current in the direction of the arrow indicated at 45 of Fig. 1 sets up a magnetic field or flux around the coil 38 which links with the coil 41, inducing a current in the coil 41 which is opposed to the flux which produced it and consequently, in the opposite direction to the flow of the current in the coil 38, and approximately ninety electrical degrees behind it in phase relation.

The current induced in the coil 41 sets up a negative charge on the normally positive plate 44 of the condenser 42, and also, by reason of its own magnetic field, causes a sharp reduction of current in the coil 38 due to the counter E. M. F. induced therein. The capacitative reactance of the condenser 42, the function of which is to restore electrical equilibrium, together with the collapsing of the magnetic field or flux of the coil 38, causes a reversal of current in the coil 41, completing the cycle, and allowing current to again build up in the coil 38, after which the cycle is repeated.

The frequency or period of oscillation is determined by the reactance values of the coil 41 and condenser 42 which constitute in effect a resonant circuit, and in this connection, it may be here observed that suitable frequency control may be obtained as desired by varying the inductive and capacitative reactance of the coil 41, or by varying the capacity of the condenser by the use of a condenser of the variable type.

By reference to Figs. 3 and 4, it will be observed that in order to position the gap 22 formed between adjacent ends of the electrodes 20 and 21, as close to the surface of the electrolyte as possible, and to insure the removal of the contents of ionization from adjacent the gap before the electrons have had an opportunity to again redistribute or associate themselves with the body of the electrolyte, the container 5 may be adjusted angularly in a vertical plane about the center of the shaft 16 merely by loosening the clamping bolts 15 and after the desired position of the gap with respect to the surface of the electrolyte is obtained, the bolts 15 may be again tightened to force the clamping member 14 against the adjacent side of the hub portion 11 and retain the container in adjusted position. To compensate for variation in volume of electrolyte due to disassociation, evaporation, or the like, the container 5, from time to time, may be angularly adjusted in the manner above described to maintain the gap in desired position with respect to the surface of the electrolyte.

The output circuit of the oscillation generator may be inductively coupled to the coil 41 as indicated at 46 in Fig. 1, or capacitatively coupled to the oscillation circuit as indicated at 47.

It will be observed from the foregoing description that the present invention provides a novel construction and arrangement whereby a constant frequency of oscillation is maintained without shifting or creeping due to drastic modulation methods or thermal changes, and wherein a continuous flow of electrons to the collecting electrode 25 is employed for energizing the primary inductive circuit.

Obviously, the present invention is not limited to the precise construction and arrangement shown and described, as the same may be variously modified. Moreover, all the features of the invention need not be used conjointly, as the same may be used to advantage in variously different combinations and sub-combinations.

Having thus described my invention, what I claim as new and desire to cover by Letters Patent is:

1. An oscillation generator comprising, in combination, a source of direct current supply, means for producing electrical oscillations comprising a primary inductive circuit and a resonant circuit including an inductance connected in series to said source of current supply, said inductance and said inductive circuit being inductively coupled, an electrolyte, a movable container therefor, a pair of electrodes mounted in said container and operatively related to said electrolyte and connected to said source of current supply for ionizing the electrolyte, a collecting electrode in said container connected between said primary inductive circuit, and said resonant circuit, and a rotor for conveying the products of ionization to said collecting electrode.

2. An oscillation generator comprising, in combination, a source of direct current supply, means for producing electrical oscillations comprising a primary inductive circuit and a resonant circuit including an inductance connected in series to said source of current supply, said inductance and said inductive circuit being inductively coupled, an electrolyte, a movable container therefor, a pair of spaced electrodes providing a gap therebetween mounted in said container in a manner to move therewith and operatively related to said electrolyte and connected to said source of current supply for ionizing the electrolyte, a third electrode in said container connected between said primary inductive circuit and said resonant circuit, and a rotor for conveying the products of ionization from adjacent said gap and depositing them on said third electrode.

3. An oscillation generator comprising, in combination, a source of direct current supply, means for producing electrical oscillations comprising a primary inductive circuit and a resonant circuit including an inductance connected in series to said source of current supply, said inductance and said inductive circuit being inductively coupled, an electrolyte, a movable container therefor, a pair of spaced electrodes providing a gap therebetween mounted in said container in a manner to move therewith and operatively related to said electrolyte and connected to said source of current supply for ionizing the electrolyte, a third electrode in said container connected between said primary inductive circuit and said resonant circuit, and a rotor of non-magnetic material extending into the electrolyte for conveying the products of ionization from adjacent said gap and depositing them on said third electrode.

4. An oscillation generator comprising, in combination, a source of direct current supply, means for producing electrical oscillations comprising a primary inductive circuit and a resonant circuit including an inductance connected in series to said source of current supply, said inductance and said inductive circuit being inductively coupled, an electrolyte, a movable container therefor, a pair of spaced electrodes providing a gap therebetween mounted in said container in a manner to move therewith to position said gap adjacent the surface of said electrolyte, said electrodes being operatively related to said electrolyte and connected to said source of current supply for ionizing the electrolyte, a third electrode in said container connected between said primary inductive circuit and said resonant circuit, and a rotor of non-magnetic material extending into the electrolyte for conveying the products of ionization from adjacent said gap and depositing them on said third electrode.

5. An oscillation generator comprising, in combination, a source of direct current supply, means for producing electrical oscillations comprising a primary inductive circuit and a resonant circuit including an inductance connected in series to said source of current supply, said inductance and said inductive circuit being inductively coupled, an electrolyte, a movable container therefor, a pair of spaced electrodes providing a gap therebetween mounted in said container in a manner to move therewith to position said gap adjacent the surface of said electrolyte, said electrodes being operatively related to said electrolyte and connected to said source of current supply for ionizing the electrolyte, a third electrode in said container spaced from said electrolyte and operatively connected between said primary inductive circuit and said resonant circuit, and a rotor of non-magnetic material having a beveled edge portion extending into the electrolyte adjacent said gap for conveying the negatively charged electrons of ionization from adjacent said gap and depositing them on said third electrode.

6. An oscillation generator comprising, in combination, a source of direct current supply, means for producing electrical oscillations comprising a primary inductive circuit and an oscillation circuit including an inductance and a condenser, said circuits being connected in series to said source of current supply, said inductance and said inductive circuit being inductively coupled, an electrolyte, a movable container therefor, a pair of spaced electrodes having their adjacent ends submerged in said electrolyte and movable with respect thereto for varying the position of the gap between said electrodes with respect to the surface of the electrolyte, said electrodes being operatively connected to said source of current supply, a non-magnetic rotor having its periphery extending into the electrolyte adjacent said gap, and a third electrode in said container positioned in spaced relation to said rotor and electrolyte and operatively connected between said primary inductive circuit and said oscillation circuit.

7. An oscillation generator comprising, in combination, a source of direct current supply, means for producing electrical oscillations comprising a primary inductive circuit and an oscillation circuit including an inductance and a condenser, said circuits being connected in series to said source of current supply, said inductance and said inductive circuit being inductively coupled, an electrolyte, an annularly movable container therefor, a pair of spaced electrodes having their adjacent ends submerged in said electrolyte and movable with respect thereto for varying the position of the gap between said electrodes with respect to the surface of the electrolyte, said electrodes being operatively connected to said source of current supply, a non-magnetic rotor having its periphery bevelled to a thin edge adapted to extend into the electrolyte adjacent said gap, and a third electrode in said container positioned in the radial plane of said rotor in spaced relation thereto and to said electrolyte and operatively connected between said primary inductive circuit and said oscillation circuit.

8. An oscillation generator comprising, in combination, a source of direct current supply, means for producing electrical oscillations comprising a primary inductive circuit and an oscillation circuit including an inductance and a condenser, said circuits being connected in series to said source of current supply, said inductance and said inductive circuit being inductively coupled, an electrolyte, an annularly movable container therefor, a pair of spaced electrodes having their adjacent ends submerged in said electrolyte and movable with respect thereto for varying the position of the gap between said electrodes with respect to the surface of the electrolyte, said electrodes being operatively connected to said source of current supply, a non-magnetic rotor having its periphery bevelled to a thin edge adapted to extend into the electrolyte adjacent said gap, and a third electrode in said container positioned in the radial plane of said rotor in spaced relation thereto and to said electrolyte and operatively connected between said primary inductive circuit and said oscillation circuit, said third electrode having an annular portion extending along the periphery of said rotor in a direction opposite to the rotation thereof.

9. An oscillation generator comprising, in combination, a source of direct current supply, means for producing electrical oscillations comprising a primary inductive circuit and an oscillation circuit including an inductance and a condenser, said circuits being connected in series to said source of current supply, said inductance and said inductive circuit being inductively coupled, an electrolyte, an annularly movable container therefor, a pair of spaced electrodes having their adjacent ends submerged in said electrolyte and movable with respect thereto for varying the position of the gap between said electrodes with respect to the surface of the electrolyte, said electrodes being operatively connected to said source of current supply, a non-magnetic rotor having its periphery bevelled to a thin edge adapted to extend into the electrolyte adjacent said gap, a third electrode in said container positioned in the radial plane of said rotor in spaced relation thereto and to said electrolyte and operatively connected between said primary inductive circuit and said oscillation circuit, said third electrode having an annular portion extending along the periphery of said rotor in a direction opposite to the rotation thereof, and means formed on said third electrode for deflecting electrolyte deposited thereon away from said rotor.

10. An oscillation generator comprising, in combination, a source of direct current supply, means for producing electrical oscillations comprising a primary inductive circuit and an oscillation circuit including an inductance and a condenser, said circuits being connected in series to said source of current supply, said inductance and said inductive circuit being inductively coupled, an electrolyte, an annularly movable container therefor, a transparent cover for said container, a pair of spaced electrodes mounted in said container and having their adjacent ends submerged in said electrolyte and movable with respect thereto for varying the position of the gap between said electrodes with respect to the surface of the electrolyte, said electrodes being operatively connected to said source of current supply, a non-magnetic rotor provided with a supporting bearing in a wall of said container and having its periphery bevelled to a thin edge adapted to extend into the electrolyte adjacent said gap, and a third electrode in said container positioned in the radial plane of said rotor in spaced relation thereto and to said electrolyte and operatively connected between said primary inductive circuit and said oscillation circuit, said third electrode having an annular portion extending along the periphery of said rotor in a direction opposite to the rotation thereof, means formed on said third electrode for deflecting electrolyte deposited thereon away from said rotor, and means for deflecting electrolyte drained from said third electrode away from said bearing.

11. An oscillation generator comprising, in combination, a source of direct current supply, means for producing electrical oscillations comprising a primary inductive circuit and an oscillation circuit including an inductance and a condenser, said circuits being connected in series to said source of current supply, said inductance and said inductive circuit being inductively coupled, a supporting bracket, a container mounted on and angularly adjustable with respect to said bracket, an electrolyte in said container, a transparent cover mounted in said container in a manner to provide a seal for retaining the electrolyte, a pair of spaced electrodes mounted in said container and having their adjacent ends submerged in the electrolyte and annularly movable with the container for varying the position of the gap between said electrodes with respect to the surface of the electrolyte, said electrodes being operatively connected to said source of current supply, a shaft rotatably mounted in said container, a non-magnetic rotor secured to said shaft and having its periphery bevelled to form a thin edge portion adapted to extend into the electrolyte adjacent said gap, a third electrode positioned in said container in the radial plane of said rotor in spaced relation thereto and to said electrolyte and operatively connected between said primary inductive circuit and said oscillation circuit, said third electrode having an annular portion extending along the periphery of said rotor in a direction opposite to the rotation thereof, said annular portion having an inwardly extending annular flange along one edge thereof and having its inner annular face inclined toward said flange, means formed on the interior of said container and positioned below said flange for receiving electrolyte therefrom and deflecting it away from the shaft bearing, and means operatively related to said container and bracket for securing the container in various positions of adjustment with respect to the bracket.

CHARLES E. JELLIFF.